(No Model.)

J. H. HITTLE & A. D. DAVIS.
HAY RACK.

No. 306,923. Patented Oct. 21, 1884.

WITNESSES:
F. McArdle
C. Sedgwick

INVENTOR:
J. H. Hittle
A. D. Davis
BY Munn & Co
ATTORNEYS.

N. PETERS, Photo-Lithographer, Washington, D. C.

UNITED STATES PATENT OFFICE.

JONAS H. HITTLE AND AURIN D. DAVIS, OF MACKINAW, ILLINOIS.

HAY-RACK.

SPECIFICATION forming part of Letters Patent No. 306,923, dated October 21, 1884.

Application filed May 13, 1884. (No model.)

*To all whom it may concern:*

Be it known that we, JONAS H. HITTLE and AURIN D. DAVIS, both of Mackinaw, in the county of Tazewell and State of Illinois, have invented a new and Improved Hay and Hog Rack, of which the following is a full, clear, and exact description.

Our invention relates to the class of racks employed in carrying hay, grain, and similar commodities; and it consists in side and end pieces which may be arranged on the wagon-box to form a rack for carrying hay, and by a different arrangement may be adapted to carry hogs, calves, and other animals.
Reference is to be had to the accompanying drawings, forming part of this specification, in which similar letters of reference indicate corresponding parts in all the figures.

Figure 1:
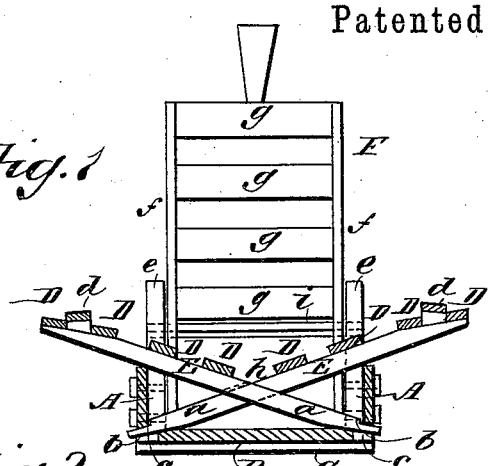
Figure 2:
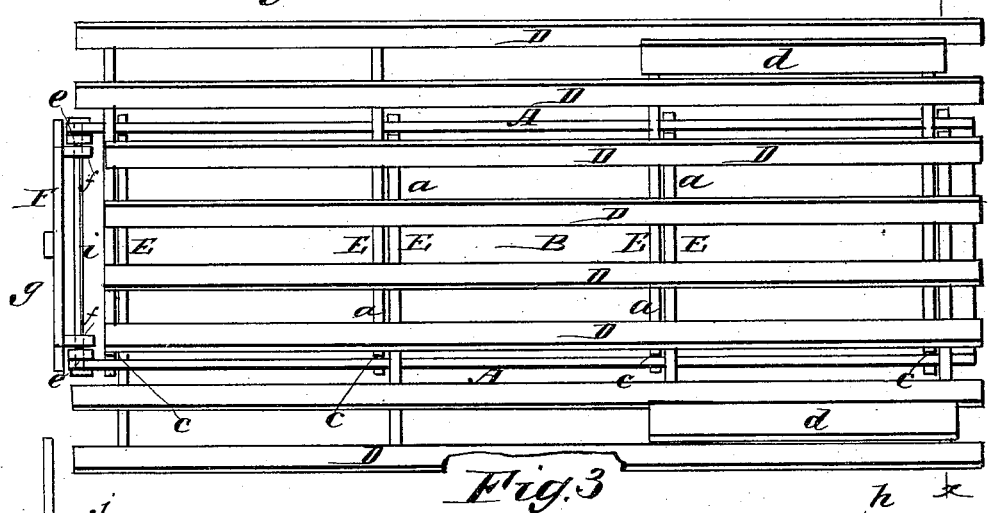
Figure 3:
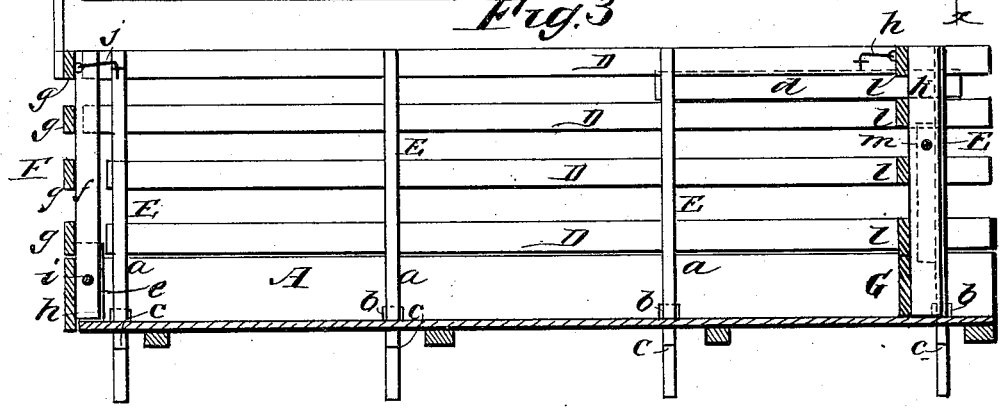
Figure 4:
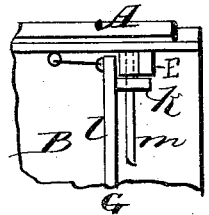

Figure 1 is a transverse section of our improved rack, taken on line *x x* in Fig. 2. Fig. 2 is a plan view. Fig. 3 is a longitudinal section showing the rack arranged for animals, and Fig. 4 is a detail view of the end-gate.

The box or body of the rack is formed of side plank, A A, bottom boards, B, and cross-pieces or cleats C, extending under the bottom boards and secured to the side plank. The sides of the rack are formed of longitudinal strips D, secured in any suitable way to cross-bars E, which are prolonged at one side of the series of strips D, forming arms *a*, which are capable of entering mortise *b* in the side plank and in the bottom board. Shoulders *c* are formed on the arms *a*, near the outer ends, to prevent them from slipping through the mortise *b*. When the rack is used for drawing hay, the arms *a* of the two halves of the rack are inserted in the mortise *b* in opposite sides of the box and crossed, the bars E resting on the upper edges of side plank, A, with the strips D uppermost. The outer ends of the bars E are beveled to render the two outer strips more nearly horizontal, and at the rear end of the rack, between the two outer strips, D, on each side of the rack and over the rear wheels of the wagon, is secured a strip, *d*, to prevent the contents of the rack from touching the wheels. Two standards, *e*, secured to the forward end of the wagon-box—one at each side thereof—
support the forward end gate, F, which is composed of side bars, *f*, and cross-bars *g h*. The cross-bar *h* projects beyond the side bars, *f*, in position to engage the standards *e* upon the outside. The end-gate F is pivoted on a rod, *i*, extending horizontally through the standards *e* and side bars, *f*. The outward pressure of hay upon the upper portion of the end-gate will hold it firmly in its position, the cross-bar *h* at the lower end thereof forming a stop for limiting its motion.

When the rack is used for animals, the side pieces are raised into a vertical position, as shown in Fig. 3, and hooks *j*, attached to the end-gate, are hooked into staples carried by the side pieces, and hold the latter in position. A rear end-gate, G, formed of side bars, *k*, and cross-bars *l*, is pivoted above its center on a rod, *m*, extending across the rear end of the rack. The end-gate G is capable of opening inward at the bottom, but cannot open outward, owing to the engagement of the lower cross-bar, *l*, with the end cross-bars, E, the lower cross-bar, *l*, being longer than the others and projecting beyond the side bars, *k*. A hook, *h*, on the end-gate engages a staple in one of the strips D and prevents the gate from being turned.

Our improved rack is very readily placed on the wagon and removed therefrom, and it is easily converted into a pen or rack for confining or transporting animals. It is cheaply made from materials to be procured anywhere.

Having thus described our invention, we claim as new and desire to secure by Letters Patent—

1. The combination, with a wagon-box slotted in its bottom, as shown at *b*, of the reversible side pieces, the cross-bars E of which are extended, as shown at *a*, whereby the said side pieces may be held vertically or crossed to serve as sides of a pen or for hay-supports, substantially as set forth.

2. The combination, with a wagon-box provided with reversible side pieces, as described, of the front end-gate, F, pivoted to the body of the wagon to form a hay-ladder or end of a pen, according to the arrangement of the side pieces, substantially as set forth.

3. The combination, with the reversible side pieces of a wagon, provided with apertured bars E at their ends, of the end-gate G, vertical bars $k$ thereon, and the horizontal rod $i$, passing through and beyond said bars $k$, whereby when the said sides are placed vertically against the end-gate the ends of rod $i$ will pass into the apertures of the bars E, substantially as set forth.

4. The combination, with the sides of a wagon having vertical bars E, of the end-gate, G, pivoted between said bars E above its center, and having its lowest bar, $l$, projecting beyond the inner edges of the bars E to form a stop, the other bars or boards being adapted to swing freely between said bars E, substantially as set forth.

JONAS H. HITTLE.
AURIN D. DAVIS.

Witnesses:
C. C. HINSHAW,
J. L. BOUCHER.